United States Patent
Wu et al.

(10) Patent No.: US 10,702,107 B2
(45) Date of Patent: Jul. 7, 2020

(54) SYSTEM AND METHOD FOR PROVIDING LIGHTING EFFECTS IN TOILET SEAT

(71) Applicant: Topseat International, Inc., Plano, TX (US)

(72) Inventors: Chengdong Wu, Allen, TX (US); Merle Edwards, Sheboygan Falls, WI (US)

(73) Assignee: Topseat International, Inc., Plano, TX (US)

( * ) Notice: Subject to any disclaimer, the term of this patent is extended or adjusted under 35 U.S.C. 154(b) by 0 days.

(21) Appl. No.: 15/597,669

(22) Filed: May 17, 2017

(65) Prior Publication Data

US 2018/0333017 A1   Nov. 22, 2018

(51) Int. Cl.
| | | |
|---|---|---|
| *A47K 13/24* | (2006.01) | |
| *F21V 33/00* | (2006.01) | |
| *F21V 15/01* | (2006.01) | |
| *F21V 8/00* | (2006.01) | |
| *F21V 23/04* | (2006.01) | |
| *F21S 9/02* | (2006.01) | |
| *F21Y 115/10* | (2016.01) | |
| *F21V 3/06* | (2018.01) | |
| *F21Y 115/20* | (2016.01) | |

(52) U.S. Cl.
CPC .............. *A47K 13/24* (2013.01); *F21V 15/01* (2013.01); *F21V 23/0464* (2013.01); *F21V 23/0471* (2013.01); *F21V 33/004* (2013.01); *G02B 6/001* (2013.01); *F21S 9/02* (2013.01); *F21V 3/06* (2018.02); *F21Y 2115/10* (2016.08); *F21Y 2115/20* (2016.08)

(58) Field of Classification Search
CPC ... F21V 33/004; F21V 23/0012; A47K 13/24; A47K 13/30; A47K 17/00; A45D 42/10; A47G 1/052; H05B 33/12
USPC ............................. 4/243, 237; D23/311, 312
See application file for complete search history.

(56) References Cited

U.S. PATENT DOCUMENTS

| | | | | |
|---|---|---|---|---|
| 3,982,288 A | * | 9/1976 | Borne | A47K 13/24 4/237 |
| 5,123,130 A | * | 6/1992 | Sanders | A47K 17/00 4/234 |
| 5,263,209 A | * | 11/1993 | Pattee | A47K 13/24 362/101 |

(Continued)

FOREIGN PATENT DOCUMENTS

| | | |
|---|---|---|
| CN | 202173353 U | 3/2012 |
| DE | 19822966 A1 | 2/1999 |

(Continued)

OTHER PUBLICATIONS

Chinese Application No. 201610033436.X filed Jan. 19, 2016, 40 pages.

(Continued)

*Primary Examiner* — Erin Deery (57) ABSTRACT

A toilet seat assembly includes a toilet seat, a toilet lid, and one or more hinges pivotally coupling the toilet seat and toilet lid. At least one of the toilet seat and the toilet lid includes a light source, a power source configured to power the light source, and a controller configured to control operation of the light source. The light source can include an electroluminescent (EL) light source or a side emitting fiber optic cable.

20 Claims, 8 Drawing Sheets

(56) References Cited

U.S. PATENT DOCUMENTS

| | | | |
|---|---|---|---|
| 5,611,089 A * | 3/1997 | Cretors | A47K 13/24 4/234 |
| 5,664,867 A | 9/1997 | Martin et al. | |
| D458,991 S * | 6/2002 | Okazaki | D23/311 |
| 7,377,661 B2 * | 5/2008 | Douglass | E03C 1/14 312/140.1 |
| 8,277,070 B1 * | 10/2012 | Schwarz | F21V 33/0012 312/140.1 |
| 9,345,110 B2 * | 5/2016 | Miller | H05B 37/0227 |
| 9,380,918 B2 * | 7/2016 | Murphy | A47K 13/24 |
| 2004/0226082 A1 * | 11/2004 | Squicciarini | A47K 13/24 4/234 |
| 2004/0227034 A1 | 11/2004 | Wentland et al. | |
| 2006/0042004 A1 * | 3/2006 | Prueitt Busch | A47K 13/24 4/661 |
| 2008/0040845 A1 | 2/2008 | Shoshan | |
| 2012/0023651 A1 * | 2/2012 | Taylor | A47K 13/24 4/234 |
| 2014/0373263 A1 | 12/2014 | Plate et al. | |
| 2015/0351594 A1 * | 12/2015 | Veros | A47K 13/24 4/237 |
| 2016/0088984 A1 | 3/2016 | Chen et al. | |
| 2016/0377271 A1 * | 12/2016 | Kelly | H05B 33/12 315/178 |

FOREIGN PATENT DOCUMENTS

| | | | |
|---|---|---|---|
| DE | 19822966 A1 * | 12/1999 | A47K 13/02 |
| EP | 3092927 A1 | 11/2016 | |

OTHER PUBLICATIONS

Communication from a foreign patent office in a counterpart foreign application, ISA/US, "International Search Report and Written Opinion of the International Searching Authority," International Application No. PCT/US2018/027989, dated Jul. 13, 2018, 10 pages.

IB, International Preliminary Report on Patentability, International Application No. PCT/US2018/027989, dated Nov. 28, 2019, 9 pages.

* cited by examiner

SYSTEM AND METHOD FOR PROVIDING LIGHTING EFFECTS IN TOILET SEAT

TECHNICAL FIELD

This disclosure is generally directed to toilets and more particularly to a system and method for providing lighting effects in a toilet seat.

BACKGROUND

Toilet seats and lids have existed in various fauns for many decades. A toilet seat provides a surface for an occupant to comfortably sit, while a toilet lid provides a protective cover for the toilet facility and helps to prevent evaporation of the water in the toilet bowl.

SUMMARY

According to one embodiment of this disclosure, a toilet seat assembly includes a toilet seat, a toilet lid, and one or more hinges pivotally coupling the toilet seat and toilet lid. At least one of the toilet seat and the toilet lid includes a light source, a power source configured to power the light source, and a controller configured to control operation of the light source.

In another embodiment, a method for manufacturing a toilet seat assembly includes providing a toilet seat. The method also includes providing a toilet lid. The method further includes pivotally coupling the toilet seat and toilet lid together using one or more hinges. At least one of the toilet seat and the toilet lid includes a light source, a power source configured to power the light source, and a controller configured to control operation of the light source.

Other technical features may be readily apparent to one skilled in the art from the following figures, descriptions and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its features, reference is now made to the following description, taken in conjunction with the accompanying drawings, in which:

FIGS. 3A through 5 illustrate details of other example illuminated toilet lids according to this disclosure;

DETAILED DESCRIPTION

FIGS. 1 through 7, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Embodiments of this disclosure are directed to lighting effects that are incorporated into a toilet seat assembly. Such lighting can assist in guiding a user to the toilet and provide illumination during use. Often, people needing to use the bathroom at night do not want to disturb other individuals in the home or turn on the bathroom light which causes them to awake more completely.

Some techniques have been proposed over the years to illuminate a toilet during the night or in a dark room. However, there are many problems with these techniques. For example, some techniques require lights that are attachable to an existing toilet or toilet seat, thereby creating potential unsanitary conditions. Some techniques place a single undistributed light source located in the hinge base or hinge housing at the rear of the toilet seat, which may not illuminate, or provide guidance to, the front of the toilet.

To address these and other issues, embodiments of this disclosure provide a lighted toilet seat or lid that provides illumination where it is needed and in a sanitary manner. One objective of the disclosed embodiments is to provide light to guide people to the front of the toilet without turning on room lighting. Another objective of the disclosed embodiments is to automate the on/off function of the light so the light is turned on automatically when needed and turned off when no longer in use. A further objective of the disclosed embodiments is to have the light for guiding and illuminating the toilet integrated into the lid or ring of the actual toilet seat so that the presence of the light does not create collection points that could create unsanitary conditions. A still further objective of the disclosed embodiments is to provide light that minimizes eye adjustment late at night thereby promoting use of the bathroom then returning with minimal sleep disruption.

Another objective of the disclosed embodiments is to provide a light for guiding and illuminating the toilet so that small children will find the bathroom less frightening, and which gives children the incentive of using the bathroom with confidence when they can see what they are doing. Another objective of the disclosed embodiments is to provide a light for guiding and illuminating the toilet that is able to provide the elderly with a toilet light for seeing in the dark in the evening hours or in the middle of the night. Another objective of the disclosed embodiments is to provide a light for guiding and illuminating toilets that requires no assembly as it is integrated within the seat or lid. Another objective of the disclosed embodiments is to provide a light for guiding and illuminating the toilet that has an easy to replace standard battery power source.

It will be understood that embodiments of this disclosure may include any one, more than one, or all of the features described here. In addition, embodiments of this disclosure may additionally or alternatively include other features not listed here. Although the disclosed embodiments are described with respect to a toilet seat, such description is not limiting since the disclosed embodiments are suitable for a wide range of applications.

Figure 1:
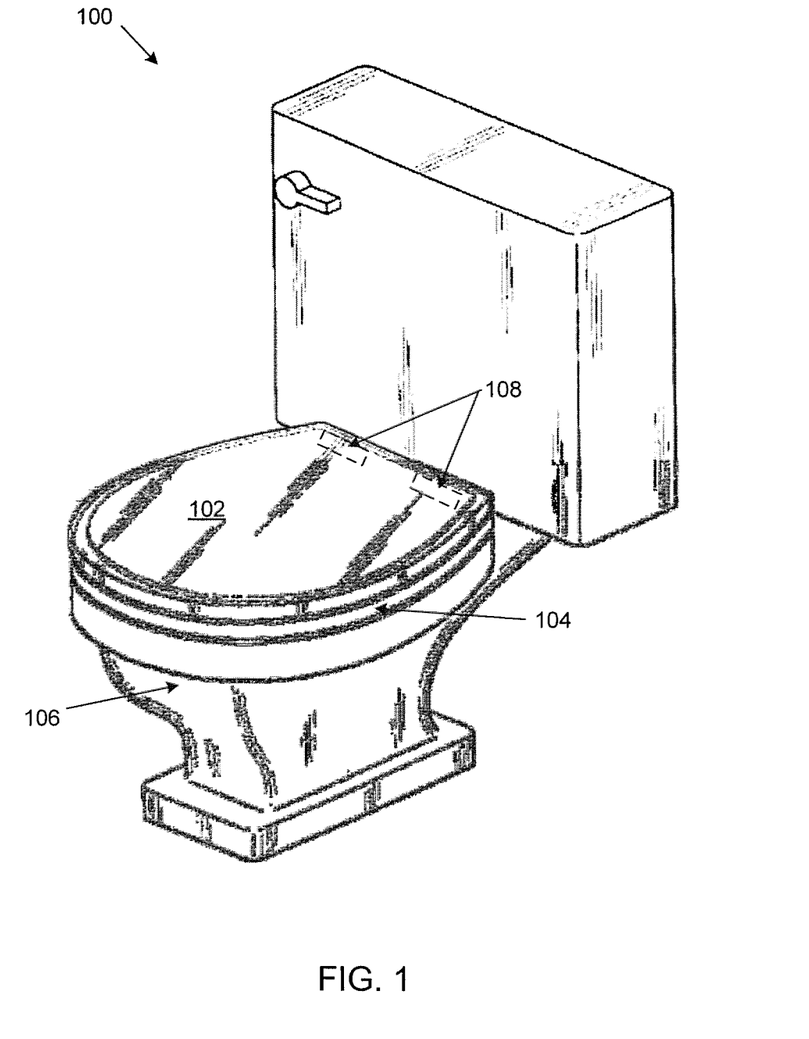
FIG. 1 illustrates a toilet with a toilet lid and toilet seat configured with one or more lighting effects, according to this disclosure.

FIG. 1 illustrates a toilet 100 with a toilet lid and toilet seat configured with one or more lighting effects, according to this disclosure. The embodiment of the toilet 100 shown in FIG. 1 is for illustration only. Other embodiments of the toilet 100 could be used without departing from the scope of this disclosure. Those skilled in the art will recognize that, for simplicity and clarity, some features and components are not explicitly shown in every figure, including those illustrated in connection with other figures. Such features, including those illustrated in other figures, will be understood to be equally applicable to the toilet 100. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIG. 1, the toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have a size and shape configured to generally match the size and shape of the bowl 106 and to cover the opening of the bowl 106. The toilet lid 102 and toilet seat 104 are pivotally coupled to each other and secured to a rear portion of the bowl 106 or toilet 100 using a pair of hinge assemblies 108 that allow the toilet lid 102 and toilet seat 104 to raise and lower independently with respect to the bowl 106 and to each other. The hinge assemblies 108 are secured to a flange portion at the rear of the bowl 106. In accordance with this disclosure, the toilet lid 102, the toilet seat 104, or both include one or more lighting elements that illuminate the toilet 100 and surrounding area with soft light. Further details regarding the lighting elements are provided below.

Although FIG. 1 depicts one example of a toilet 100 with a toilet lid 102 and toilet seat 104, various changes may be made to FIG. 1. For example, while the bowl 106 is depicted as generally round or oval in shape, the bowl 106 could include other shapes, such as a rectangle or octagon.

Figure 2:
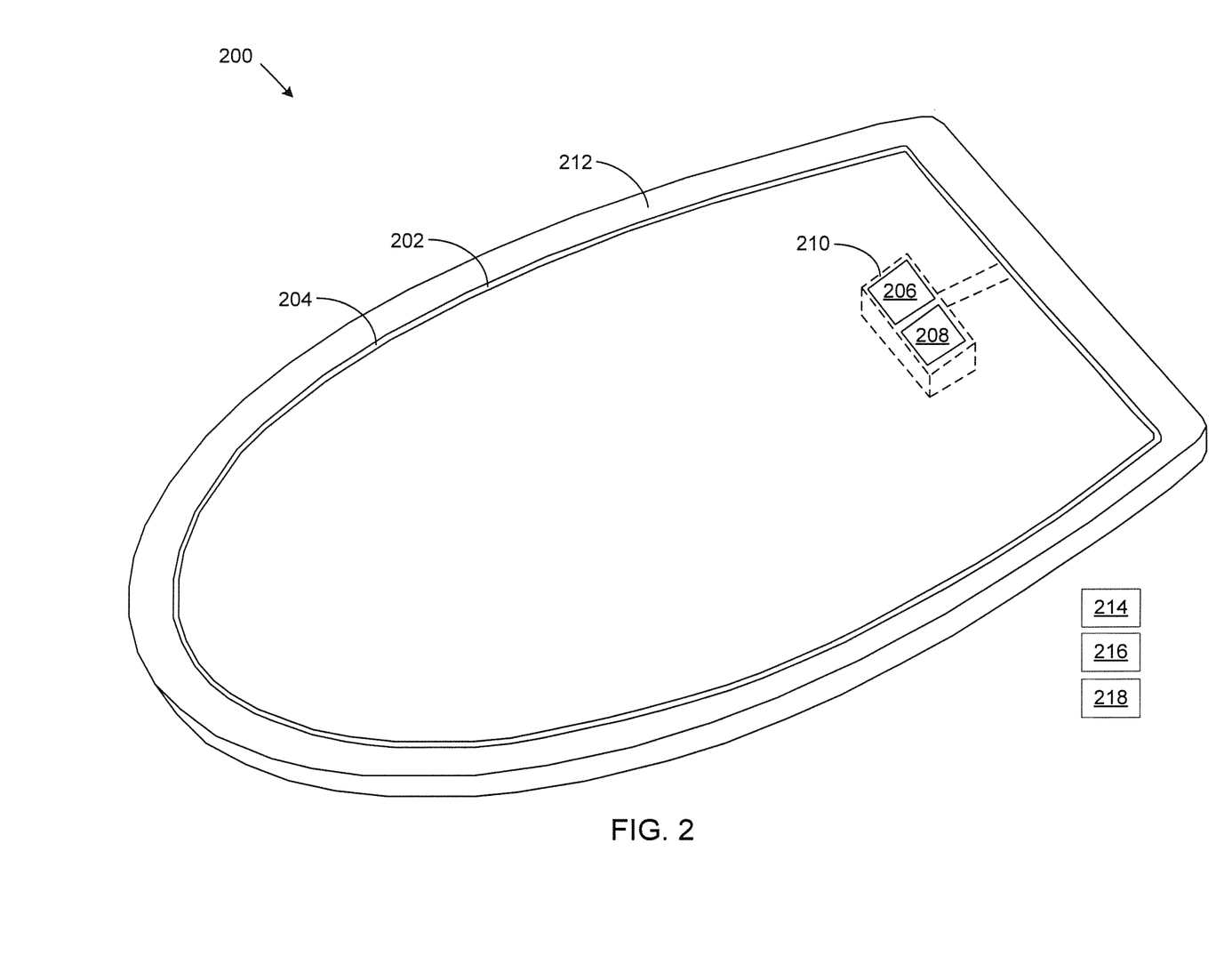
FIG. 2 illustrates details of an example illuminated toilet lid according to this disclosure.

FIG. 2 illustrates details of an example illuminated toilet lid 200 according to this disclosure. The embodiment of the toilet lid 200 shown in FIG. 2 is for illustration only. Other embodiments of the toilet lid 200 could be used without departing from the scope of this disclosure. For ease of explanation, the toilet lid 200 may represent the toilet lid 102 of FIG. 1. In addition, features of the toilet lid 200 can be incorporated into the toilet seat 104. It will be understood, however, that the toilet lid 200 may represent any other suitable toilet lid or seat.

As shown in FIG. 2, the toilet lid 200 has a groove 202 disposed in the underside (i.e., bottom surface) of the toilet lid 200. The groove 202 extends substantially or completely around a perimeter of the toilet lid 200 near the outside edge of the toilet lid 200. As shown in FIG. 2, the groove 202 generally follows a line that is parallel to the edge of the toilet lid 200. In other embodiments, the groove 202 may be further away from the edge and closer to the center. Positioned within the groove 202 is a linear light source 204. In some embodiments, the groove 202 has dimensions just large enough that the light source 204 can fit snugly within the groove 202.

In some embodiments, the light source 204 is an electroluminescent (EL) wire light source. As known in the art, EL light technology generates a soft visible light that is advantageous for guiding a person in a dark room without being harsh or too bright. EL light typically includes three different products—EL wire, EL tape, and EL pads. EL wire is long and has a small, round cross section. EL wire generates light along the full length of the wire. EL tape is also long, but has a wider, thinner cross section. The width of EL tape can range from 0.2 inch up to 4 inches or more, while the thickness of EL tape can range from less than one millimeter to 20 millimeters or more. An EL pad is similar in thickness to EL tape but is designed to have a length and width associated with various shapes, such as a rectangle, circle, or oval.

The light source 204 is powered by a power source 206 and controlled by a controller 208. In some embodiments, the power source 206 and controller 208 are disposed together in a control box 210 that is embedded in a recess or cavity on the bottom surface of the toilet lid 200. One end of the light source 204 is coupled to the power source 206, which provides power to the entire length of the light source 204. In some embodiments, the power source 206 includes one or more batteries, such as one or more AA, AAA, or 9V batteries. In some embodiments, the one or more batteries may be rechargeable batteries. The controller 208 controls operation of the light source 204, such as turning the light source 204 on and off (i.e., activating and deactivating the light source 204). In some embodiments, the controller 208 includes a timer function that allows the light source 204 to turn on and off according to a time cycle (e.g., on during the night hours and off during the day hours). In some embodiments, the timer function can be controlled or programmed by a user.

In some embodiments, a clear or translucent protective layer 212 is disposed over the bottom surface of the toilet lid 200 to protect the light source 204. A clear layer 212 allows the light from the light source 204 to be easily seen. A translucent layer 212 can diffuse the light from the light source 204, thereby appearing illuminated itself. In some embodiments, the protective layer 212 is formed of acrylic (e.g., polymethyl-methacrylate (PMMA)).

In some embodiments, the toilet lid 200 can include one or more sensors, such as a light sensor 214, a sound sensor 216 (e.g., a microphone), and a motion sensor 218. The light sensor 214 may detect ambient light within the bathroom. Such ambient light may affect operation of the light source 204. For example, when the light sensor 214 detects that the bathroom light is on, the light sensor 214 can transmit a signal to the controller 208, and in response, the controller 208 can turn off the light source 204 since the light from the light source 204 is not needed. Similarly, the sound sensor 216 can detect ambient sound (e.g., a person's footsteps), and the motion sensor 218 can detect movement near the toilet (e.g., a person moving toward the toilet). When the sensors 216-218 detect sound or motion, the sensors 216-218 can transmit a signal to the controller 208, and in response, the controller 208 can turn on the light source 204 to assist a person that may be approaching the toilet. In some embodiments, the light source 204 can remain illuminated for a predetermined period of time after sound or motion is no longer detected. While FIG. 2 depicts the sensors 214-218 outside of the toilet lid 200, the sensors 214-218 could be disposed in any location on, in, or around the toilet lid 200 in a manner that provides advantageous operation of the sensors 214-218.

As indicated above, while FIG. 2 describes a toilet lid 200 that includes a light source 204, these features can be additionally or alternatively incorporated into the toilet seat 104. For example, a light source 204 can be disposed on the bottom surface of the toilet seat 104 so that the light is directed down and into the toilet bowl. Since the inside of the bowl is typically white, reflective porcelain, the reflective surface of the toilet bowl diffuses and reflects the light out of the bowl.

Figure 3A:
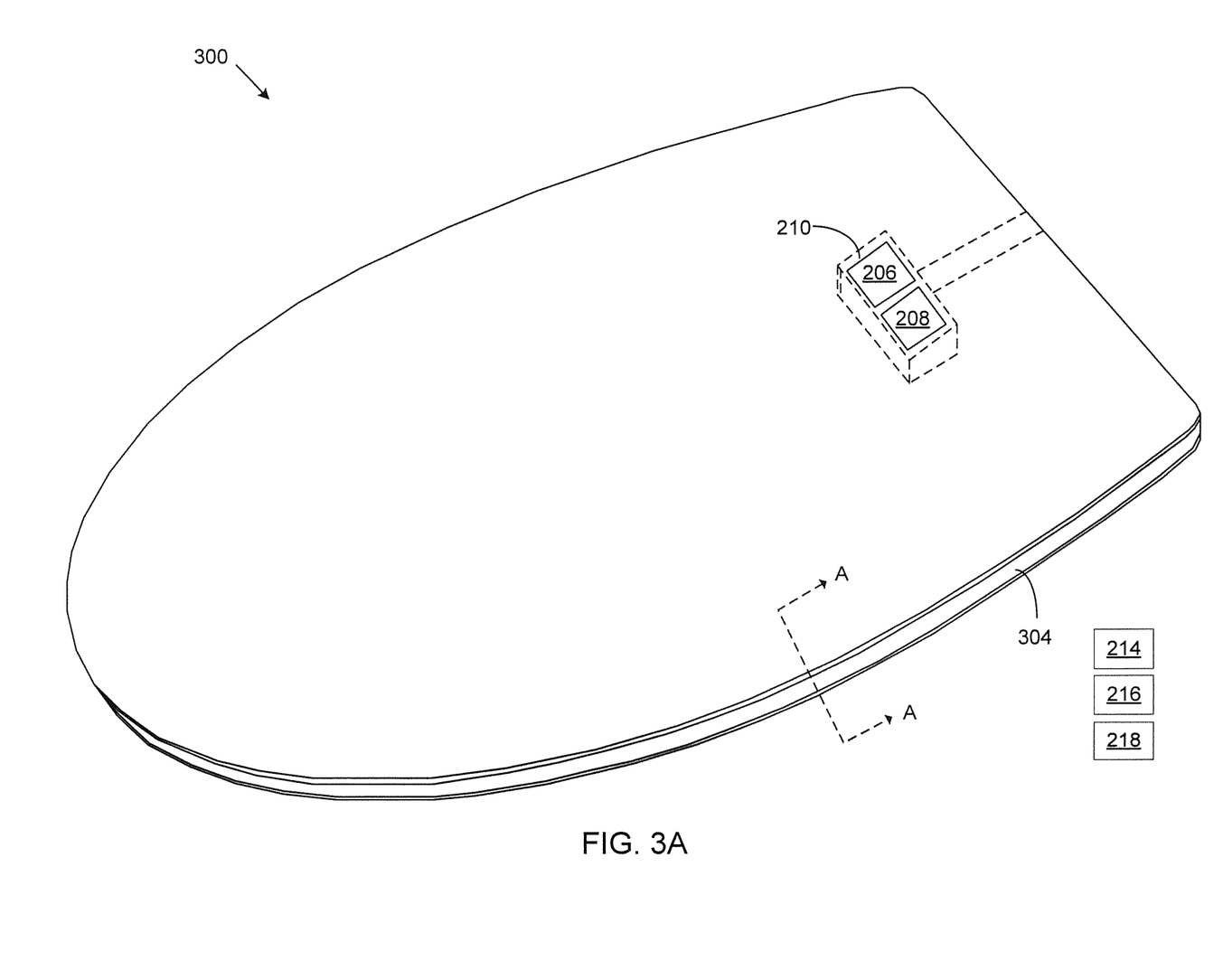
Figure 3B:
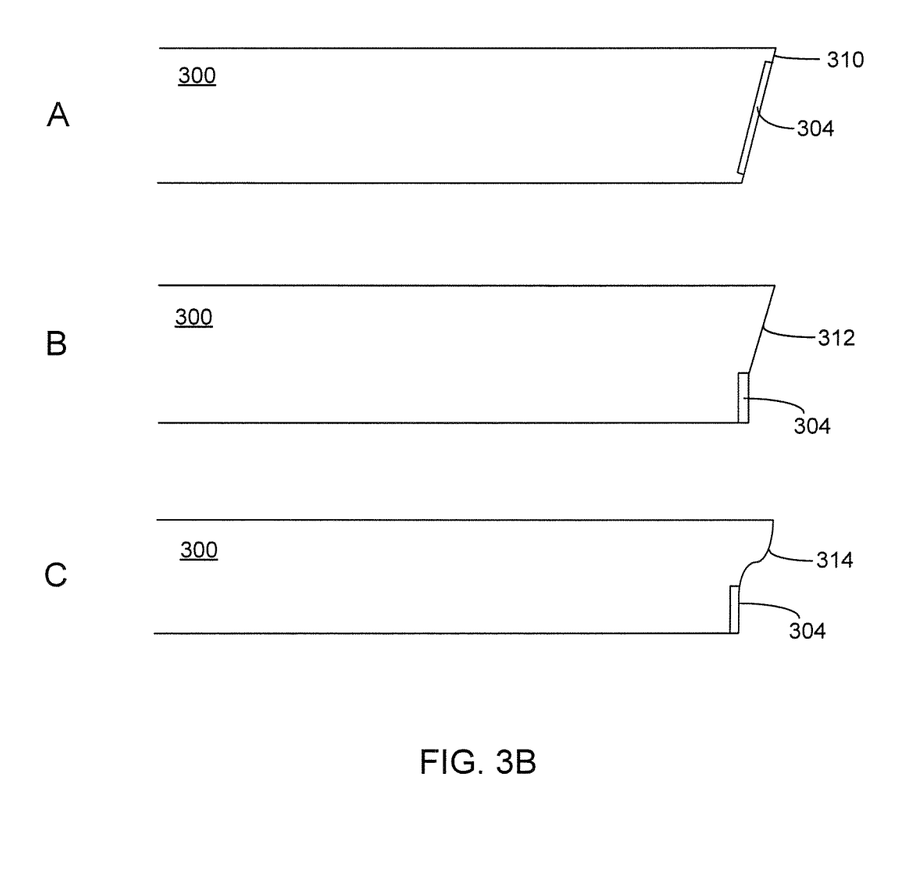

FIGS. 3A and 3B illustrate details of another example illuminated toilet lid 300 according to this disclosure. The embodiments of the toilet lid 300 shown in FIGS. 3A and 3B are for illustration only. Other embodiments of the toilet lid 300 could be used without departing from the scope of this disclosure. For ease of explanation, the toilet lid 300 may represent the toilet lid 102 of FIG. 1. In addition, features of the toilet lid 300 can be incorporated into the toilet seat 104. It will be understood, however, that the toilet lid 300 may represent any other suitable toilet lid or seat.

The toilet lid 300 includes many of the same or similar features as the toilet lid 200 of FIG. 2. For example, the toilet lid 300 includes a power source 206 and a controller 208 that can be disposed together in a control box 210. The toilet lid 300 can also include one or more of the sensors 214-218. These components operate in the same or similar way as in FIG. 2, so a detailed description of these components will not be repeated here.

Instead of (or in addition to) a light source in a groove on the bottom surface (as shown in FIG. 2), the toilet lid 300 includes a light source 304 disposed on the edge of the toilet lid 300. In some embodiments, the light source 304 is an EL tape. In some embodiments, the light source 304 extends substantially around the perimeter of the toilet lid 300. For example, the light source 304 may be disposed on the curved front and side edges of the toilet lid 300, but not on the back edge of the toilet lid. Or the light source 304 may be disposed on the curved front and side edges and the back edge of the toilet lid 300. When the light source 304 is EL tape, the EL tape has a substantially flat ribbon shape and is disposed on a flat edge surface of the toilet lid 300. In some embodiments, the EL tape has a thickness of approximately 0.2 mm-0.4 mm, although other thicknesses are possible. In some embodiments, the light source 304 may be recessed in a groove that has a depth equal to the thickness of the light source 304, so that the light source 304 and surrounding surfaces are flush.

FIG. 3B illustrates cross-sectional views of the toilet lid 300 taken along the line A-A in FIG. 3A according to different embodiments. In the view "A", the toilet lid 300 has a flat edge 310 that slopes inward and downward. The light source 304 is recessed in a groove in the flat edge 310. As shown the view "A", the light source 304 may include an EL tape with a width of approximately 15 mm. The slope of the flat edge 310 causes the light emitting from the light source 310 to project mainly in a somewhat downward angle, thereby illuminating the floor surrounding the toilet and reducing the brightness of the light projecting up toward the user's eyes. In the view "B", the toilet lid 300 also has a flat edge 312 that slopes inward and downward. However, the light source 304 is recessed in a smaller, vertically-oriented groove below the flat edge 312. Thus, the light source 304 in the view "B" has a narrower width than the light source 304 in the view "A". For example, the light source 304 may include an EL tape with a width of approximately 6-7 mm. The narrower light source emits less light and uses less power. Since the emitted light is not as bright, the light source 304 in the view "B" can be oriented vertically and project light straight outward without being too harsh to a user in a dark bathroom. In the view "C", the toilet lid 300 has a curved edge 314 and a narrow (e.g., 6-7 mm width) light source 304 recessed in a smaller, vertically-oriented groove below the curved edge 314. Of course, other combinations of edges and light sources are possible, and the views "A" through "C" are not intended to be limiting.

Figure 4:
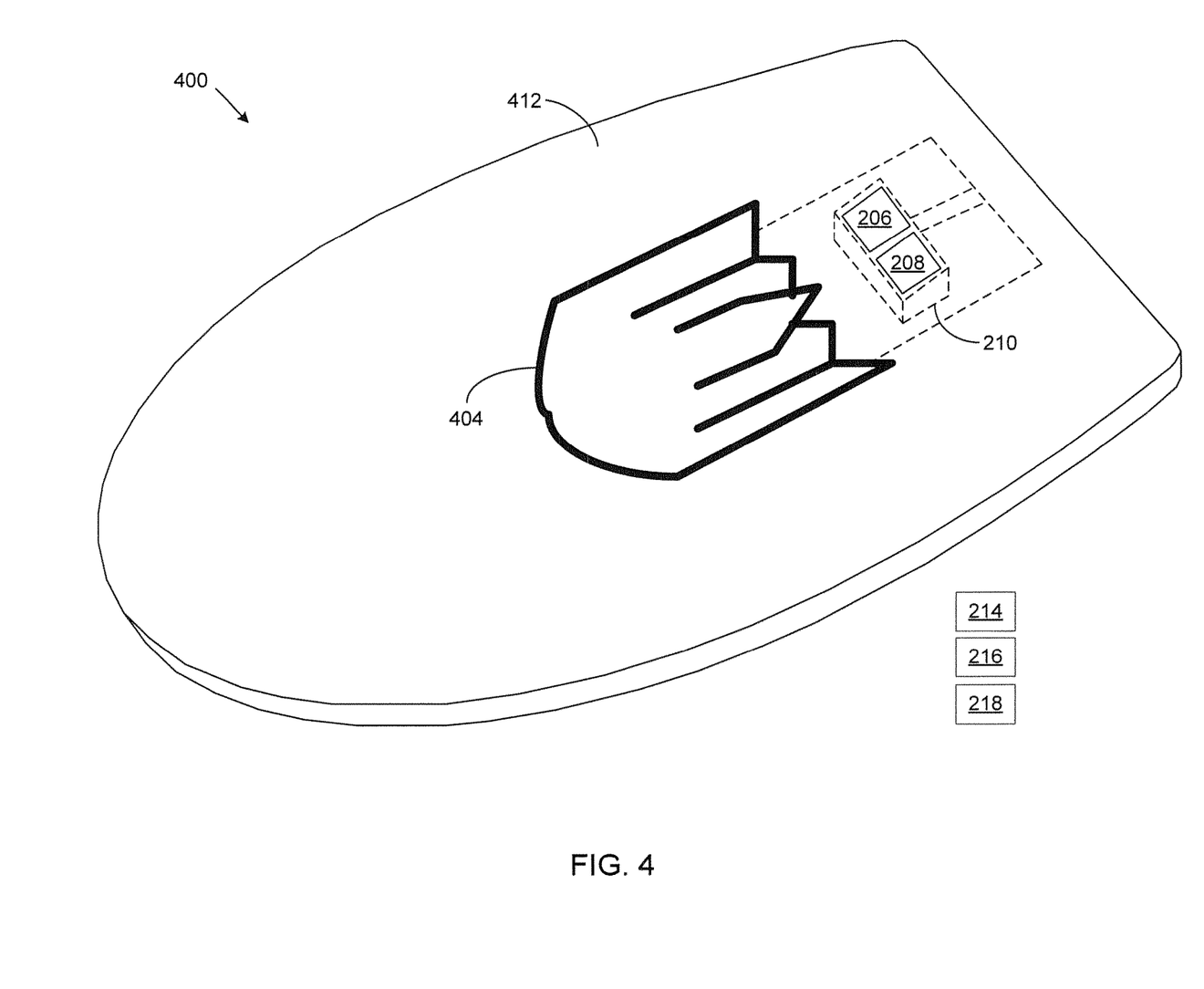

FIG. 4 illustrates details of another example illuminated toilet lid 400 according to this disclosure. The embodiment of the toilet lid 400 shown in FIG. 4 is for illustration only. Other embodiments of the toilet lid 400 could be used without departing from the scope of this disclosure. For ease of explanation, the toilet lid 400 may represent the toilet lid 102 of FIG. 1. In addition, features of the toilet lid 400 can be incorporated into the toilet seat 104. It will be understood, however, that the toilet lid 400 may represent any other suitable toilet lid or seat.

The toilet lid 400 includes many of the same or similar features as the toilet lid 200 of FIG. 2. For example, the toilet lid 400 includes a power source 206 and a controller 208 that can be disposed together in a control box 210. The toilet lid 400 can also include one or more of the sensors 214-218. These components operate in the same or similar way as in FIG. 2, so a detailed description of these components will not be repeated here.

The toilet lid 400 includes a light source 404 disposed on the top surface of the toilet lid 400. In some embodiments, the light source 404 is EL tape, EL wire, an EL pad, or a combination of two or more of these. The light source 404 can be arranged and laid out in the top surface of the toilet lid 400 to form one or more designs or images that illuminate when the light source 404 is activated. The lighted designs or images on the toilet lid 400 not only guide the user but provide a sense of pleasure, interest, or humor to the bathroom motif.

In order to protect the light source 404, a protective layer 412 (e.g., a clear or translucent acrylic sheet) can be mounted on top of the toilet lid 400, similar to the protective layer 212 of FIG. 2.

Figure 5:
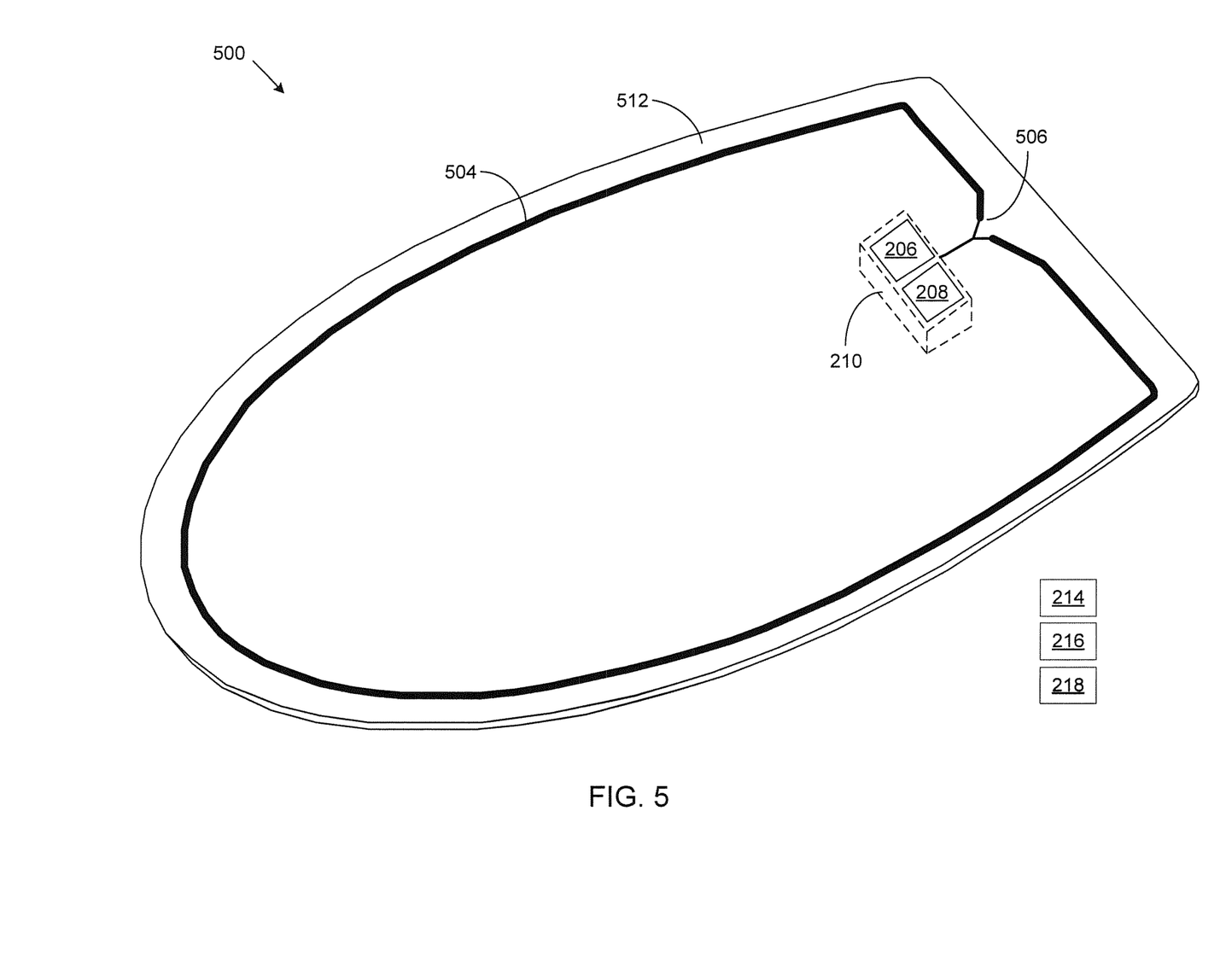

FIG. 5 illustrates details of another example illuminated toilet lid 500 according to this disclosure. The embodiment of the toilet lid 500 shown in FIG. 5 is for illustration only. Other embodiments of the toilet lid 500 could be used without departing from the scope of this disclosure. For ease of explanation, the toilet lid 500 may represent the toilet lid 102 of FIG. 1. In addition, features of the toilet lid 500 can be incorporated into the toilet seat 104. It will be understood, however, that the toilet lid 500 may represent any other suitable toilet lid or seat.

The toilet lid 500 includes many of the same or similar features as the toilet lid 200 of FIG. 2. For example, the toilet lid 500 includes a power source 206 and a controller 208 that can be disposed together in a control box 210. The toilet lid 500 can also include one or more of the sensors 214-218. These components operate in the same or similar way as in FIG. 2, so a detailed description of these components will not be repeated here.

In FIG. 5, the toilet lid 500 includes a light source 504 that generates and distributes light using light emitting diode (LED) technology combined with side emitting fiber optic technology, rather than EL technology. The LED light source 504 includes one or more small LEDs directly connected to a side emitting fiber optic cable. Reference number 506 indicates the connection point between the LED(s) and the fiber optic cable. During operation, the controller 208 activates the LED(s), and the light from the LED(s) travels down the fiber optic cable and is transmitted outward along the length of the fiber optic cable due to the side emitting properties of the cable. Typically, LEDs use less power than EL lights of similar output, so one advantage of the embodiments of FIG. 5 can be longer battery life.

In some embodiments, the toilet lid 500 includes a clear or translucent (e.g., acrylic) layer 512 disposed on the bottom surface of the toilet lid 500. The LED light source 504 can be mounted on the surface of the layer 512. Alternatively, the layer 512 can include a groove configured to receive the LED light source 504, similar to the embodiment shown in FIG. 2. When the light source 504 is illuminated, the light from the fiber optic cable is transmitted through the edge of the layer 512. In other embodiments, a groove can be formed in the core of the toilet lid 500, the cable of the light source 504 rests in the groove, and the layer 512 covers the groove and light source 504, thereby protecting the light source 504.

In some embodiments, the fiber optic cable light source 504 can be additionally or alternatively disposed on the edge of the toilet lid 500, similar to the embodiment shown in FIGS. 3A and 3B.

Figure 6:
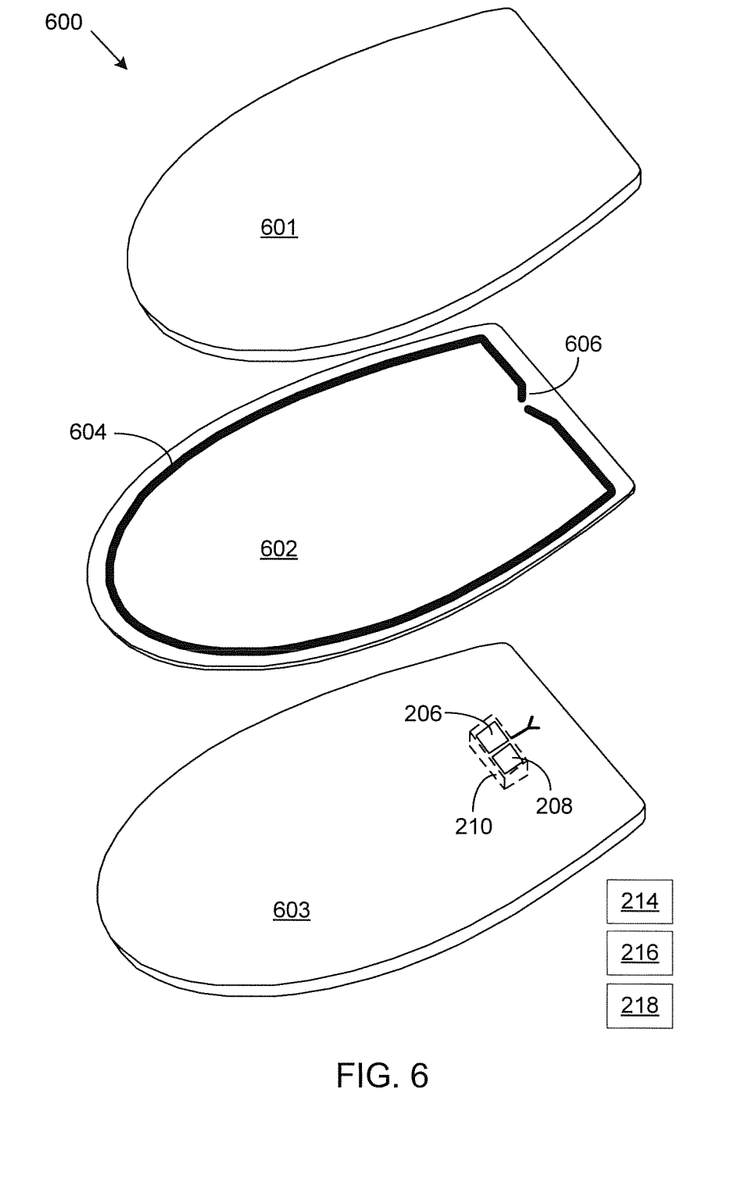
FIG. 6 illustrates an exploded view of another example illuminated toilet lid according to this disclosure.

FIG. 6 illustrates an exploded view of another example illuminated toilet lid 600 according to this disclosure. The embodiment of the toilet lid 600 shown in FIG. 6 is for illustration only. Other embodiments of the toilet lid 600 could be used without departing from the scope of this disclosure. For ease of explanation, the toilet lid 600 may represent the toilet lid 102 of FIG. 1. In addition, features of the toilet lid 600 can be incorporated into the toilet seat 104. It will be understood, however, that the toilet lid 600 may represent any other suitable toilet lid or seat.

The toilet lid 600 includes many of the same or similar features as the toilet lid 200 of FIG. 2. For example, the toilet lid 600 includes a power source 206 and a controller 208 that can be disposed together in a control box 210. The toilet lid 600 can also include one or more of the sensors 214-218. These components operate in the same or similar way as in FIG. 2, so a detailed description of these components will not be repeated here.

As shown in FIG. 6, the toilet lid 600 is formed of multiple layers 601-603. The top layer 601 and the bottom layer 603 are solid structural layers that, together, are similar to a core layer of other toilet lids, such as the toilet lids 200, 300, 400, 500. The power source 206, controller 208, and control box 210 are disposed in a cavity or recess in the bottom layer 603. Alternatively, the power source 206, controller 208, and control box 210 can be disposed in a cavity or recess in the top layer 601.

Disposed between the top layer 601 and the bottom layer 603 is a clear or translucent (e.g., acrylic) layer 602. An LED light source 604 is mounted on the surface of the layer 602 before the layers 601-603 are coupled to each other. Alternatively, the layer 602 can include a groove configured to receive the LED light source 604, similar to the embodiment shown in FIG. 2. The LED light source 604 includes one or more LEDs coupled to a side emitting fiber optic cable. Reference number 606 indicates the connection point between the LED(s) and the fiber optic cable. When the light source 604 is illuminated, the light from the fiber optic cable is transmitted through the edge of the layer 602, thereby creating a ring of light around the toilet lid 600.

Although FIGS. 2 through 6 depict various details of example toilet seats and toilet lids, various changes may be made to FIGS. 2 through 6. For example, while shown comprised of certain components, the toilet seats and toilet lids described herein may include more or fewer components. Components shown in FIGS. 2 through 6 may be removed, repeated, or arranged in a different order. Components may have dimensions other than those shown or described. Other components, composed of the same or different materials, may be added to the assemblies shown in FIGS. 2 through 6.

Figure 7:
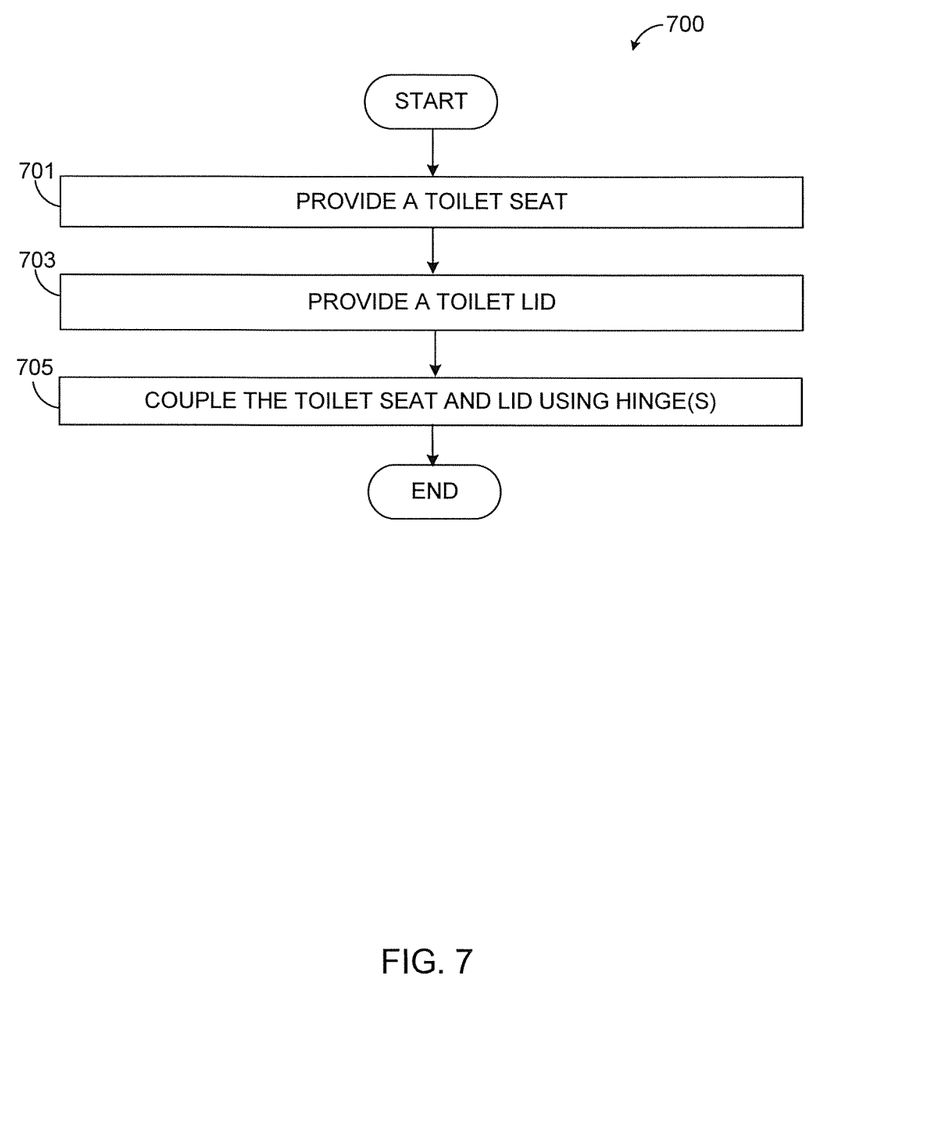
FIG. 7 depicts a method for manufacturing a toilet lid and seat assembly that includes one or more lighting effects, according to this disclosure.

FIG. 7 depicts a method 700 for manufacturing a toilet lid and seat assembly that includes one or more lighting effects, according to this disclosure. The method 700 is for illustration only. Other embodiments of the method 700 could be used without departing from the scope of this disclosure.

At operation 701, a toilet seat is provided. This can include providing one of the toilet seats described herein, such as the toilet seat 104.

At operation 703, a toilet lid is provided. This can include providing one of the toilet lids described herein, such as the toilet lid 102. The toilet lid, the toilet seat, or both include a light source, a power source configured to power the light source, and a controller configured to control operation of the light source. The light source, power source, and controller can be formed and arranged as shown in the embodiments of FIGS. 2 through 6.

In various embodiments, the light source can include an EL wire, an EL tape or pad, or a side emitting fiber optic cable. In various embodiments, the light source is disposed in a groove that extends along at least a majority of a circumferential distance around a bottom surface of the at least one of the toilet seat and the toilet lid. In various embodiments, the groove and light source is covered with a clear or translucent layer. In various embodiments, the light source is disposed on an edge surface that extends along at least a majority of a circumferential distance around the at least one of the toilet seat and the toilet lid. In various embodiments, the light source is disposed on a top surface of the at least one of the toilet seat and the toilet lid, and the light source is arranged to faun one or more designs or images that illuminate when the light source is activated.

At operation 705, the toilet seat and toilet lid are pivotally coupled together using one or more hinges. This can include coupling the toilet lid 102 and the toilet seat 104 together with one or more hinge assemblies 108.

Although FIG. 7 illustrates one example of a method for manufacturing a toilet lid and seat assembly that includes one or more lighting effects, various changes may be made to FIG. 7. For example, while shown as a series of steps, various steps in FIG. 7 may overlap, occur in parallel, occur in a different order, or occur multiple times.

As described herein, embodiments of this disclosure provide a toilet seat and lid assembly that generates and distributes light around the toilet. This distributed light is advantageously visible when the seat and lid are either open or closed, and without the need to generate an intense light. The soft light generated by the disclosed embodiments reduces the potential of waking the user when using the toilet at night. In some embodiments, the distributed light can be configured to create artistic displays.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A toilet seat assembly comprising:
    a toilet seat;
    a toilet lid; and
    one or more hinges pivotally coupling the toilet seat and the toilet lid,
    wherein the toilet lid comprises:
        a first edge surface comprising a flat recess disposed on the first edge surface, the flat recess extending along at least a majority of a circumferential distance around the toilet lid, the flat recess having a depth and a length that is greater than the depth, wherein a first end of the flat recess coincides with a bottom surface of the toilet lid and the length of the flat recess is perpendicular to the bottom surface of the toilet lid;
        a second edge surface extending along at least the majority of the circumferential distance around the toilet lid, wherein a first end of the second edge surface coincides with a second end of the flat recess opposite the first end of the flat recess and a second end of the second edge surface forms an angle with a top surface of the toilet lid, wherein the second edge surface has a curved profile; and
        a light source disposed in the flat recess of the toilet lid, the light source comprising an electroluminescent (EL) tape having a first thickness that is the same as the depth of the flat recess;
        a power source configured to power the light source; and
        a controller configured to control operation of the light source.

2. The toilet seat assembly of claim 1, wherein the power source and the controller are disposed in a control box in a recess on the bottom surface of the toilet lid.

3. The toilet seat assembly of claim 1, further comprising at least one motion sensor configured to:
    detect motion near the toilet seat assembly; and
    in response to the detection of the motion, transmit a signal to the controller, the signal configured to cause the controller to activate or deactivate the light source.

4. The toilet seat assembly of claim 1, further comprising at least one light sensor configured to:
    detect light near the toilet seat assembly; and
    in response to the detection of the light, transmit a signal to the controller, the signal configured to cause the controller to activate or deactivate the light source.

5. The toilet seat assembly of claim 1, further comprising at least one sound sensor configured to:
    detect sound near the toilet seat assembly; and
    in response to the detection of the sound, transmit a signal to the controller, the signal configured to cause the controller to activate or deactivate the light source.

6. The toilet seat assembly of claim 1, wherein the light source is not disposed on a back edge of the toilet lid.

7. The toilet seat assembly of claim 1, wherein the EL tape has a thickness of 0.2 mm-0.4 mm.

8. The toilet seat assembly of claim 7, wherein the EL tape has a width of 15 mm.

9. The toilet seat assembly of claim 7, wherein the EL tape has a width of 6 mm-7 mm.

10. The toilet seat assembly of claim 1, wherein the power source comprises at least one battery.

11. A method for manufacturing a toilet seat assembly, the method comprising:
    providing a toilet seat;
    providing a toilet lid; and
    pivotally coupling the toilet seat and the toilet lid together using one or more hinges;
    wherein the toilet lid comprises:
        a first edge surface comprising a flat recess disposed on the first edge surface, the flat recess extending along at least a majority of a circumferential distance around the toilet lid, the flat recess having a depth and a length that is greater than the depth, wherein a first end of the flat recess coincides with a bottom surface of the toilet lid and the length of the flat recess is perpendicular to the bottom surface of the toilet lid;
        a second edge surface extending along at least the majority of the circumferential distance around the toilet lid, wherein a first end of the second edge surface coincides with a second end of the flat recess opposite the first end of the flat recess and a second end of the second edge surface forms an angle with a top surface of the toilet lid, wherein the second edge surface has a curved profile; and
        a light source disposed in the flat recess of the toilet lid, the light source comprising an electroluminescent (EL) tape having a first thickness that is the same as the depth of the flat recess;
        a power source configured to power the light source; and
        a controller configured to control operation of the light source.

12. The method of claim 11, wherein the power source and the controller are disposed in a control box in a recess on the bottom surface of the toilet lid.

13. The method of claim 11, further comprising:
    providing at least one motion sensor configured to:
        detect motion near the toilet seat assembly; and
        in response to the detection of the motion, transmit a signal to the controller, the signal configured to cause the controller to activate or deactivate the light source.

14. The method of claim 11, further comprising:
    providing at least one light sensor configured to:
        detect light near the toilet seat assembly; and
        in response to the detection of the light, transmit a signal to the controller, the signal configured to cause the controller to activate or deactivate the light source.

15. The method of claim 11, further comprising:
    providing at least one sound sensor configured to:
        detect sound near the toilet seat assembly; and in response to the detection of the sound, transmit a signal to the controller, the signal configured to cause the controller to activate or deactivate the light source.

16. The method of claim 11, wherein the light source is not disposed on a back edge of the toilet lid.

17. The method of claim 11, wherein the EL tape has a thickness of 0.2 mm-0.4 mm.

18. The method of claim 17, wherein the EL tape has a width of 15 mm.

19. The method of claim 17, wherein the EL tape has a width of approximately 6 mm-7 mm.

20. The method of claim 11, wherein the power source comprises at least one battery.

* * * * *